United States Patent [19]

Pearson

[11] Patent Number: 4,970,181

[45] Date of Patent: Nov. 13, 1990

[54] PROCESS FOR PRODUCING CERAMIC SHAPES

[75] Inventor: Alan Pearson, Murrysville, Pa.

[73] Assignee: Aluminum Company of America, Pittsburgh, Pa.

[21] Appl. No.: 247,541

[22] Filed: Sep. 22, 1988

Related U.S. Application Data

[63] Continuation-in-part of Ser. No. 920,449, Oct. 20, 1986, abandoned.

[51] Int. Cl.$^5$ .............................................. C04B 35/10
[52] U.S. Cl. ................................... 501/127; 501/153; 501/95
[58] Field of Search ........................... 501/95, 127, 153

[56] References Cited

U.S. PATENT DOCUMENTS

| | | | |
|---|---|---|---|
| 2,486,901 | 9/1949 | Bowden et al. | 501/127 |
| 3,284,218 | 11/1966 | King | 501/127 |
| 3,953,563 | 4/1976 | Kihlstedt et al. | 501/119 |
| 4,391,918 | 7/1983 | Brockmeyer | 501/127 |
| 4,579,839 | 4/1986 | Pearson | 302/355 |

FOREIGN PATENT DOCUMENTS 3129059  6/1988  Japan .

Primary Examiner—William R. Dixon, Jr.
Assistant Examiner—Melissa Bonner
Attorney, Agent, or Firm—Andrew Alexander

[57] ABSTRACT

Disclosed is a method capable of forming complex green body shapes containing alumina for forming into ceramic products. The method comprises providing a slurry containing alumina powder and an aqueous solution in an amount to provide a high level of solids in the slurry and adding to the slurry rehydratable alumina powder to provide a mix, the rehydratable alumina being present in an amount sufficient to cause the mix to harden. The mix is then permitted to harden to a solid body suitable for firing into a ceramic product.

67 Claims, 1 Drawing Sheet

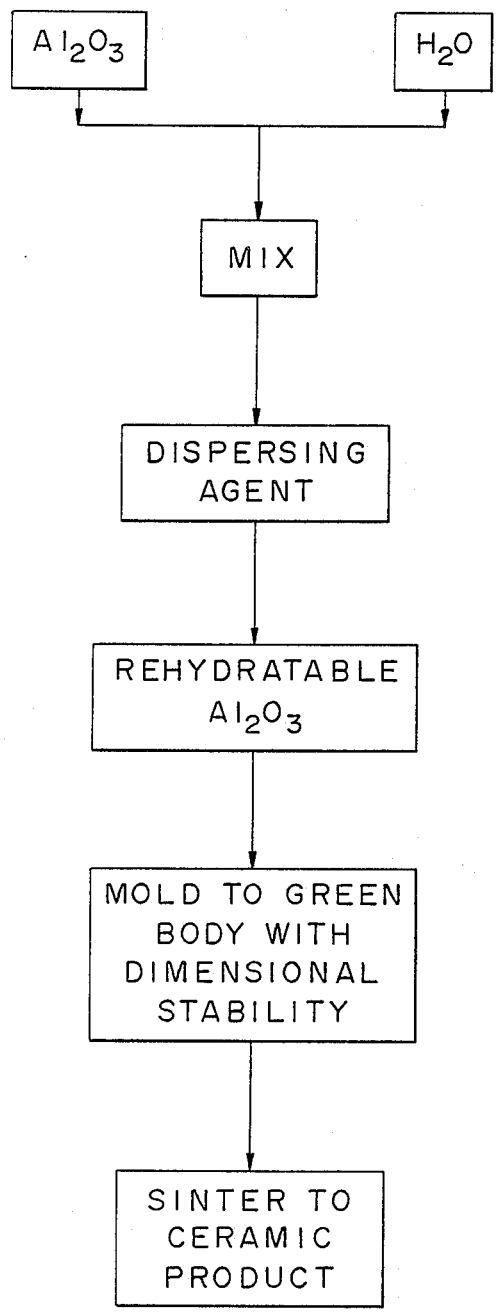

PROCESS FOR PRODUCING CERAMIC SHAPES

This application is a continuation-in-part of U.S. Ser. No. 920,449, filed Oct. 20, 1986, now abandoned.

INTRODUCTION

This invention relates to ceramic shapes, and more particularly it relates to a method capable of making complex ceramic shapes.

Ceramics, for example, alumina base ceramics, are generally manufactured by first forming a green body or shape from a powder followed by drying and sintering. Green forming processes include dry pressing, slip casting, extrusion and injection molding. However, each of these forming processes have certain disadvantages. For example, in dry pressing, there are always variations in pressure throughout the mold which result in density variations in the pressed piece. Additionally, powder is usually agglomerated and zones between agglomerates tend to contain large pores or low density areas. In slip casting, a slurry of powder in water is placed in a porous mold and the water is then withdrawn by vacuum or capillary action and areas near the mold tend to be more densely packed. In extrusion forming, normally the powder is mixed with water and a plasticizer and is extruded as a thick paste. Again, pressure variations and nonuniform dispersion of additives can result in density variations and large pores. Another disadvantage of extrusion is that it is generally limited to formation of simple shapes. Injection molding involves mixing the powder with an organic polymer heating the mix (causing the polymer to melt) and injecting it into a cold mold where the polymer solidifies. However, in injection forming, the polymer is expensive and difficult to disperse uniformly through fine powder. With these prior art forming processes, large pores and nonuniform powder packing, particularly in the green body, results in nonuniform shrinkage during firing, causing warping and straining after sintering. Often, sintering requires higher temperatures to avoid large pores.

In the prior art, patent (U.S. Pat. No 4,444,899) discloses a process for producing a low density formed product of an activated alumina having a macro pore volume. In the process, 10 to 100% by weight of a solid material selected from the group consisting of an alumina powder capable of being at least partially rehydrated is mixed with a second material such as alpha alumina, silica, alumina hydrate, etc. However, the size of the solid material must be very carefully controlled. Also, U.S. Pat. No. 4,005,407 discloses preparing shaped alumina particles for catalysts or catalyst supports by passing droplets of an aqueous slurry of a rehydratable alumina composition through a shaping medium, such as a column of water-immersible liquid. The alumina composition undergoes rehydration while being shaped as it passes through the shaping medium and firm, discrete alumina bodies are produced.

SUMMARY OF THE INVENTION

It is, therefore, an object of the invention to produce complex green body shapes.

It is another object of this invention to produce complex ceramic shapes.

It is a further object of this invention to produce ceramic bodies containing alumina.

And it is yet another object of this invention to produce high purity alumina ceramics.

And yet a further object of this invention is to provide a process capable of producing complex ceramic shapes.

And yet another object of this invention is to provide a process for producing ceramic bodies formed from fine particle size ceramic powders such as alumina powders.

And yet still another object of this invention is to provide a process for producing ceramic bodies containing alumina, for example, wherein the rate of hardening of the green body can be controlled.

In accordance with these objects, there is provided a method capable of producing complex ceramic shapes containing alumina or other powder suitable for use in ceramics, the method comprising the steps of providing a slurry containing the powder and water, the powder being present in an amount sufficient to provide a high level of solids in said slurry and adding to said slurry rehydratable alumina powder to provide a mix, the rehydratable alumina being present in an amount sufficient to cause said mix to harden. After adding the mix to a mold, it is permitted to harden to a solid body and then may be fired to produce an alumina containing ceramic product.

BRIEF DESCRIPTION OF THE DRAWING

FIG. 1 is a flow chart illustrating the process of the invention.

DETAILED DESCRIPTION OF THE PREFERRED EMBODIMENTS

Referring now to FIG. 1, there is shown a flow chart illustrating steps which may be used in the process of the invention where green bodies are produced having dimensional stability suitable for firing to produce a ceramic product.

In the process, ceramic powder, for example, is provided in an aqueous solution. A useful particle size up to 0.125 inch can be used when the end product is a refractory material, depending to some extent on the properties desired in the final product. Preferably, in the alumina powder system, a particle size in the range of about 0.05 to 44 micrometers with typical sizes being in the range of 0.1 to 10 micrometers is used. Alumina powder which has been tested and found satisfactory is available from the Aluminum Company of America, under the designation Alcoa XA-139.

When a mix of alumina powder and water is used, the mix or slurry should have a high level of solids in order to minimize shrinkage in subsequent firing. By a high level of solid is meant to include at least 50 wt. % powder in the slurry. Preferred levels of solids in the slurry can be in the range of 60 to 90 wt. %, or higher, alumina. It will be appreciated that for other ceramic powder systems these weight ranges can change.

After mixing, the slurry may be ultrasonically dispersed and a water soluble dispersing agent such as nitric acid or Darvan C or Darvan 821, available from R. T. Vanderbilt Co., Inc., Norwalk, Conn., or p-hydroxybenzoic acid, may be used. Normally, not more than 1 wt. % based on solids, of the dispersing agent is required.

To the slurry is added rehydratable alumina to provide a mix, the rehydratable alumina being added in an amount sufficient or effective in causing the mix to harden into a green body. When the slurry contains alumina in an amount which constitutes a high level of solids, or a low level of liquid is used, 1 wt. % rehydratable alumina (based on the amount of solid present in the mix) can be sufficient to cause bonding and provide the green body dimensional stability which permits handling and processing of the body to a ceramic product with substantial freedom from warping, cracking or porosity often encountered or attendant traditional processing. If a lower level of solids is used, e.g., high level liquid, then a greater amount of rehydratable alumina, e.g., 5 to 10 wt. %, can be required. It is believed that even lesser amounts may be effective, e.g., including at least 0.1 wt. %, if the particle size of the rehydratable alumina is quite small, e.g., on the order of 0.1 to about 0.5 micrometers.

Rehydratable alumina which is useful in the present invention is alumina which will react in slurry containing ceramic powder to cause the slurry to solidify. Such rehydratable alumina, for example, is described in my U.S. Pat. No. 4,579,839, incorporated herein by reference. As presently understood, amounts of rehydratable alumina required to produce a hardened green body do not have to exceed 20 wt. %, although higher amounts may be used if density and such warpage features are tolerable in the ceramic product.

The particle size of the rehydratable alumina powder can range from 0.1 to 10 or 20 micrometers, however, larger amounts of rehydratable alumina can be required when coarser particle sizes are used. The preferred particle size is in the range of 0.3 to 5 micrometers.

While the inventor does not necessarily wish to be bound by any theory of invention, it is believed that smaller particles of rehydratable alumina is more effective in producing the dimensionally stable green body because a smaller particle size gives a greater number of particles for a green weight percent, thereby providing a more uniform dispersion of the rehydratable component.

The aqueous solution can be distilled or deionized water; however, it may be desirable to use other liquids such as acidic, basic or organic solutions. The acidity of the aqueous solution may be changed to control the rate of the rehydratable reaction e.g., using a thermally activated pH modifier. For example, if the acidity is increased, the reaction slows down and consequently a greater time is required for the green body to reach dimensional stability. Conversely, if the acidity is lowered, the rate of reaction is increased to produce a suitable green body. Preferably, the mix is maintained at a pH in the range of 4 to 12 when the slurry contains alumina powder. Suitable green bodies have been produced from slurries where the pH was 4, 5 and 10, for example. In addition, the rate of reaction is influenced by the temperature of the mix. That is, the rate of reaction is increased with an increase in temperature. Thus, a highly reactive mixture can be prepared at room or lower temperatures to retard reaction and then formed or shaped in heated molds to speed up the reaction. Suitable green bodies have been prepared at room temperature (about 74° F) and at temperatures as high as 212° F. However, even higher temperatures are not presently known to be detrimental but the use of higher temperatures may influence the type of material used for the mold, e.g. wax, rubber, etc.

Once the mix has been prepared, it can be formed into simple or complex green body shapes using wax or rubber molds, for example, where the mix is poured into the mold and allowed to harden. Metal or ceramic type molds may also be used. Additionally, the mix may be formed into a green body continuously using an extrusion mold.

After being introduced to the mold, it is preferred to treat the mix to remove air bubbles after which it is permitted to harden. The time to harden to a solid body can be as short as a few minutes or extend to a few hours with longer times not known to be detrimental. However, for economic purposes, the time provided to produce a hardened or solid body should be as short as possible.

After the mix has hardened, it can be removed from the mold and the green body may then be sintered to a ceramic product.

The green body has a density in the range of 30 to 70% theoretical density, typically greater than 45% theoretical density. After sintering, the ceramic product can have a density as low as 65% theoretical density or even lower, depending on processing. Densities of over 85% and even over 95% theoretical density can easily be obtained.

Ceramic bodies prepared in accordance with the invention have the advantage that a green body can be formed economically in simple or intricate shapes with some machining being performed, if necessary, and then fired to a ceramic product while avoiding warping or other objectional shape changes. Further, the process may be used to make precision shapes with only minor machining or polishing.

A further advantage is that solid bodies or castings can be formed from fine particle size powder, e.g. alumina, without the presence of large pores or low density zones, which greatly adds to the integrity of the body. Additionally, the process can be used to produce ceramic bodies having complex shapes, the shapes requiring essentially no machining to produce the final dimensions because of the high level of dimensional stability between the green body and the final ceramic. Further, the ceramic bodies produced in accordance with the present invention can have a high level of purity because binders are not required to maintain the green body shape.

While reference has been made mainly to alumina to produce an alumina ceramic product, it will be understood that other powders useful in producing ceramic material may be used. Additionally, combinations of such non-rehydratable powders may be used and sufficient rehydratably bondable alumina can be added thereto to form a green body having dimensional stability suitable for firing into a ceramic product. The following includes ceramic powders which may be rehydratably bonded into green bodies for firing into ceramic products: silica, silicon nitride, titanium carbide, niobium carbide, tungsten carbide, silicon nitride, titanium nitride, magnesium oxide, zinc oxide, mullite, zircon, zirconia and boron carbide.

In addition, zirconia, hafnia, yttria, chromia and rare earths may be added to improve ductility and flexural strength. Further, it is contemplated within the scope of the invention that ceramic bodies having fiber reinforced materials contained therein may be formed in accordance with the invention.

The following examples are still further illustrative of the invention.

EXAMPLE 1

A high solids slurry was prepared by mixing 400 g of Alcoa XA-139 alumina powder, 80 cc distilled water and 0.4 g HNO₃ (70%) in a blender. Four grams of rehydratable alumina powder (CP-7 available from Alcoa) was added and the slurry was allowed to stand in a covered beaker at room temperature. After standing overnight, the slurry had thickened some but was still fluid.

EXAMPLE 2

Example 1 was repeated except 4 g of hexamethylenetetramine (HTMA) was also added. The mixture began to thicken within about 15 minutes. After standing at room temperature overnight, the mixture was a thick paste but not hard.

EXAMPLE 3

Example 1 was repeated except 8 g of rehydratable alumina (CP-7) was used. After standing overnight, it was a thick paste.

EXAMPLE 4

Example 1 was repeated except 12 g of CP-7 was used. After standing overnight, it was nearly solid.

EXAMPLE 5

Example 1 was repeated except 16 g of CP-7 was used. After standing 90 minutes, it was nearly solid. After standing overnight, it was solid and could be removed from the beaker as a

EXAMPLE 6

Example 1 was repeated except it was heated in a water bath to 140° F. after adding the CP-7. The mix was solid within 1 hour.

EXAMPLE 7

Example 1 was repeated except 4 g rehydratable alumina (CP-1) was used as rehydratable alumina. After standing overnight, it was thick but not hard.

EXAMPLE 8

Example 1 was repeated except 8 g rehydratable alumina (CP-1) was used. After standing overnight, it had set hard. It was removed from the beaker as a solid chunk, dried and sintered 1 hour at 1565° C. After sintering, it was a dense ceramic with no cracks or warpage.

EXAMPLE 9

This example demonstrates the ability to retard or accelerate the hardening process through temperature control. The procedure of Example 1 was repeated except 10 g of CP-05 was used as the rehydratable alumina component. After mixing, the slurry was divided into three parts, placed and sealed in plastic bags. One part was placed in an ice bath, one was kept at room temperature, and the third was heated to 150° F. The samples were checked periodically to determine if they had set up. Within about 5 minutes, the 150° F. sample had become a thick paste and within 15 minutes it had completely solidified. The room temperature sample slowly thickened and after 5 hours had become a thick paste. After 24 hours, it was completely solid. The cold sample was still fluid (no apparent change from starting consistency) after 5 hours. It was removed from the ice bath, and after standing overnight at room temperature, it had solidified.

EXAMPLE 10

Fiber reinforced alumina ceramic products were prepared by adding 80 grams of A16SG alumina and 1.4 grams SiC whiskers to a solution containing 20 grams of H₂O and 1 gram Darvan C to form a slurry. Thereafter, to the slurry was added 4 grams CP-1 activated alumina to form a mix. The mix was placed in a mold at room temperature for 12 hours which permitted it to harden to green body strength. The green body was dried at 110° C. for ½ hour and then fired at 1550° C. for 1 hour to provide an SiC fiber reinforced alumina base ceramic product. The SiC fiber content was 1.6 wt. %. Similar samples were prepared where the SiC fiber content was 4.0 wt. %, 8.1 wt. %, 15.7 wt. % and 22.8 wt. %. The last two examples used 40 grams H₂O with 8 grams CP-1 and 75 grams H₂O with 15 grams CP-1, respectively. In each example, the mix had hardened to a solid green body after standing for 12 hours at room temperature.

EXAMPLE 11

Similarly, two samples were prepared using B₄C granular particulate. The composition of the first sample was 84.7 wt. % alumina, 9.4 wt. % B₄C, 4.7 wt. % rehydratable alumina (CP-1) and 1.0 wt. % Darvan C. The second sample contained 75.5 wt. % alumina, 18.9 wt. % B₄C, 4.7 wt. % rehydratable alumina (CP-1) (CP-1) and 0.9 wt. % Darvan C. After mixing and pouring into molds, the samples were permitted to stand for 24 hours and hardened to a solid green body.

EXAMPLE 12

Two alumina based ceramic products having various amounts of additions were prepared in accordance with the invention. The first sample contained 1.1 wt. % calcium carbonate, 2.0 wt. % talc, 2.9 wt. % EPK clay, 87.9 wt. % alumina (A-17), 5.1 wt. % CP-1 and 1 wt. % Darvan C. The second sample contained 1.8 wt. % calcium carbonate, 6.8 wt. % talc, 4.0 wt. % EPK clay, 2.02 wt. % SiO₂, 78.7 wt. % alumina, 4.9 wt. % CP-1 and 1.0 wt. % Darvan C. In each sample, after forming a water slurry, the mix was poured into molds and permitted to stand overnight, whereupon it had hardened into a solid body.

The CP-powders referred to above are flash activated gibbsite samples which differ mainly by particle size. CP-7, CP-1 and CP-05 have average particle sizes of 7, 1 and 0.5 microns, respectively.

While the invention has been described in terms of preferred embodiments, the claims appended hereto are intended to encompass other embodiments which fall within the spirit of the invention.

What is claimed is:

1. A method of forming complex green body shapes containing alumina for forming into ceramic products, the method comprising the steps of:
    (a) providing a slurry containing non-rehydratable ceramic powder and an aqueous solution in an amount to provide a high level of solids in said slurry;
    (b) adding to said slurry rehydratable alumina powder to provide a mix, the rehydratable alumina being present in an amount sufficient to cause said mix to harden; and
    (c) permitting said mix to harden to a solid body having a density of at least 45% theoretical density suitable for firing into a ceramic product.

2. The method in accordance with claim 1 wherein the mix contains at least 50 wt. % solids.

3. The method in accordance with claim 1 wherein the mix contains a solids level in the range of 50 to 90 wt. %.

4. The method in accordance with claim 1 wherein the aqueous solution contains a dispersing agent.

5. The method in accordance with claim 1 wherein at least 0.1 wt. % rehydratable alumina is provided in the mix.

6. The method in accordance with claim 1 wherein the rehydratable alumina has a particle size of at least 0.1 micrometers.

7. The method in accordance with claim 1 wherein the amount of rehydratable alumina added to said mix is less than 10 wt. %.

8. The method in accordance with claim 1 wherein the rehydratable alumina has a particle size of less than 20 micrometers.

9. The method in accordance with claim 1 wherein the aqueous solution has a pH in the range of 4 to 12.

10. The method in accordance with claim 1 wherein the rate of hardening said mix is accelerated by raising the pH of the aqueous solution.

11. The method in accordance with claim 1 including the step of heating to accelerate hardening of said mix.

12. The method in accordance with claim 1 wherein the mix is maintained at room temperature to harden into a green body.

13. The method in accordance with claim 1 wherein the mix contains about 1 to about 23 wt. % reinforcing fibers.

14. The method in accordance with claim 13 wherein the fibers are silicon carbide.

15. The method in accordance with claim 13 wherein the fibers are boron carbide.

16. A method of forming complex green body shapes containing alumina for forming into alumina products, the method comprising the steps of:
    (a) providing a slurry containing a non-rehydratable alumina ceramic powder and an aqueous solution in an amount to provide a solid level of at least 50 wt. % in said slurry;
    (b) adding to said slurry rehydratable alumina powder to provide a mix, the rehydratable alumina being present in an amount sufficient to cause said mix to harden; and
    (c) permitting said mix to harden to a solid body having a density of at least 45% theoretical density suitable for firing into a ceramic product.

17. The method in accordance with claim 16 wherein the rehydratable alumina is in the range of 0.1 to less than 10 wt. % and has a particle size of at least 0.1 micrometers.

18. The method in accordance with claim 16 wherein the mix contains about 1 to about 23 wt. % reinforcing fibers.

19. The method in accordance with claim 18 wherein the fibers are silicon carbide.

20. The method in accordance with claim 18 wherein the fibers are boron carbide.

21. The method in accordance with claim 1 wherein the slurry contains a thermally activated pH modifier.

22. A ceramic powder and rehydratable alumina powder contained in a mix suitable for mixing into a slurry by the addition of an aqueous solution in an amount which provides a high level of solids in the slurry and capable of forming complex green body shapes, the mix containing a rehydratable alumina powder in an amount sufficient to cause said slurry to harden to a solid body having a density of at least 45% theoretical density.

23. The mix in accordance with claim 22 wherein the slurry contains at least 50 wt. % solids.

24. The mix in accordance with claim 22 wherein the slurry contains a solids level in the range of wt. % 50 to 90.

25. The mix in accordance with claim 22 wherein the mix contains rehydratable alumina in the range of 0.1 to 10 wt. %.

26. The mix in accordance with claim 22 wherein the mix contains rehydratable alumina having a particle size in the range of 0.1 to 20 micrometers.

27. The mix in accordance with claim 22 wherein the aqueous solution has a pH in the range of 4 to 12.

28. The mix in accordance with claim 22 wherein the mix contains about 1 to about 23 wt. % reinforcing fibers.

29. The mix in accordance with claim 28 wherein the fibers are silicon carbide.

30. The mix in accordance with claim 28 wherein the fibers are boron carbide.

31. The mix in accordance with claim 22 wherein the ceramic powder mix contains at least one non-rehydratable ceramic powder selected from the group consisting of alumina, silica, silicon nitride, titanium carbide, niobium carbide, tungsten carbide, titanium nitride, magnesium oxide, zinc oxide, mullite, zircon, zirconia and boron carbide.

32. The mix in accordance with claim 31 wherein the ceramic powder is alumina.

33. The mix in accordance with claim 32 wherein the mix contains about 1 to about 23 wt. % reinforcing fibers.

34. The mix in accordance with claim 32 wherein the fibers are silicon carbide.

35. The mix in accordance with claim 33 wherein the fibers are boron carbide.

36. The mix in accordance with claim 33 wherein the rehydratable alumina is in the range of 0.1 to 10 wt. % and has a particle size of at least 0.1 micrometers.

37. A ceramic powder and rehydratable alumina containing slurry suitable for forming into solid green bodies and firing to a ceramic product, the slurry formed by addition to said ceramic powder and rehydratable alumina an aqueous solution in an amount which provides a high level of solids, the slurry containing a rehydratable alumina in an amount sufficient to cause said slurry to harden into a solid body having a density of at least 45% theoretical density.

38. A ceramic powder slurry in accordance with claim 37 wherein the slurry contains at least 50 wt. % solids.

39. A ceramic powder slurry in accordance with claim 37 wherein the slurry contains a solids level in the range of 50 to 90 wt. %.

40. A ceramic powder slurry in accordance with claim 37 wherein the mix contains rehydratable alumina in the range of 0.1 to less than 10 wt. %.

41. A ceramic powder slurry in accordance with claim 37 wherein the mix contains rehydratable alumina having a particle size in the range of 0.1 to 20 micrometers.

42. A ceramic powder slurry in accordance with claim 37 wherein the aqueous solution has a pH in the range of 4 to 12.

43. A ceramic powder slurry in accordance with claim 37 wherein the mix contains about 1 to about 23 wt. % reinforcing fibers.

44. A ceramic powder slurry in accordance with claim 43 wherein the fibers are silicon carbide.

45. A ceramic powder slurry in accordance with claim 43 wherein the fibers are boron carbide.

46. The ceramic powder slurry in accordance with claim 37 wherein the ceramic powder is non-rehydratable and contains at least one of the ceramic powders selected from the group consisting of silica, titanium carbide, niobium carbide, tungsten carbide, silicon nitride, titanium nitride, magnesium oxide, zinc oxide, mullite, zircon, zirconia and boron carbide.

47. A ceramic powder slurry in accordance with claim 37 wherein the ceramic powder is alumina.

48. A ceramic powder slurry in accordance with claim 47 wherein the mix contains about 1 to about 23 wt. % reinforcing fibers.

49. A ceramic powder slurry in accordance with claim 48 wherein the fibers are silicon carbide.

50. A ceramic powder slurry in accordance with claim 48 wherein the fibers are boron carbide.

51. A ceramic powder slurry in accordance with claim 47 wherein the rehydratable alumina is in the range of 0.1 to less than 10 wt. % and has a particle size of at least 0.1 micrometers.

52. A ceramic product formed from firing a solid green body, the body resulting from a slurry containing ceramic powder and rehydratable alumina in an aqueous solution in an amount to provide a high level of solids in the slurry, the slurry containing rehydratable alumina in an amount sufficient to cause the slurry to harden to said solid green body having a density of at least 45% theoretical density theoretical density.

53. A ceramic product in accordance with claim 52 wherein the slurry contains at least 50 wt. % solids.

54. A ceramic product in accordance with claim 52 wherein the slurry contains a solids level in the range of 50 to 90 wt. %.

55. A ceramic product in accordance with claim 52 wherein the mix contains rehydratable alumina in the range of 0.1 to 10 wt. %.

56. A ceramic product in accordance with claim 52 wherein the mix contains rehydratable alumina having a particle size in the range of 0.1 to 20 micrometers.

57. A ceramic product in accordance with claim 52 wherein the aqueous solution has a pH in the range of 4 to 12.

58. A ceramic product in accordance with claim 52 wherein the mix contains about 1 to about 23 wt. % reinforcing fibers.

59. A ceramic product in accordance with claim 58 wherein the fibers are silicon carbide.

60. A ceramic product in accordance with claim 58 wherein the fibers are boron carbide.

61. A ceramic product in accordance with claim 52 wherein the ceramic powder is non-rehydratable and contains at least one of the ceramic powders selected from the group consisting of silica, titanium carbide, niobium carbide, tungsten carbide, silicon nitride, titanium nitride, magnesium oxide, zinc oxide, mullite, zircon, zirconia and boron carbide.

62. A ceramic product in accordance with claim 52 wherein the ceramic powder is alumina.

63. A ceramic product in accordance with claim 62 wherein the mix contains about 1 to about 23 wt. % reinforcing fibers.

64. A ceramic product in accordance with claim 63 wherein the fibers are silicon carbide.

65. A ceramic product in accordance with claim 63 wherein the fibers are boron carbide.

66. A ceramic product in accordance with claim 62 wherein the rehydratable alumina is in the range of 0.1 to 10 wt. % and has a particle size of at least 0.1 micrometers.

67. The method in accordance with claim 1 wherein the ceramic powder is at least one powder selected from the group consisting of alumina, silica, silicon nitride, titanium carbide, niobium carbide, tungsten carbide, titanium nitride, magnesium oxide, zinc oxide, mullite, zircon, zirconia, and boron carbide.

* * * * *

UNITED STATES PATENT AND TRADEMARK OFFICE
CERTIFICATE OF CORRECTION

PATENT NO. : 4,970,181
DATED : November 13, 1990
INVENTOR(S) : Alan Pearson

It is certified that error appears in the above-identified patent and that said Letters Patent is hereby corrected as shown below:

| | |
|---|---|
| Col. 5, line 22 | Delete "CP-7" and insert --rehydratable alumina (CP-7)--. |
| Col. 5, line 26 | Delete "CP-7" and insert --rehydratable alumina (CP-7)--. |
| Col. 5, line 29 | After "as a" insert --solid block--. |
| Col. 5, line 33 | After "the" delete "CP-7" and insert --rehydratable alumina (CP-7)--. |
| Col. 5, line 53 | After "10 g of" delete "CP-05" and insert --rehydratable alumina (CP-05)--. |
| Col. 6, line 7 | After " 4 grams" delete "CP-1" and insert --rehydratable alumina (CP-1)--. |
| Col. 6, line 17 | After "8 grams" delete "CP-1" and insert --rehydratable alumina (CP-1)--. |
| Col. 6, line 17 | After "15 grams" delete "CP-1" and insert --rehydratable alumina (CP-1)--. |

UNITED STATES PATENT AND TRADEMARK OFFICE
CERTIFICATE OF CORRECTION

PATENT NO. : 4,970,181                                 Page 2 of 2

DATED : November 13, 1990

INVENTOR(S) : Alan Pearson

It is certified that error appears in the above—identified patent and that said Letters Patent is hereby corrected as shown below:

Col. 6, line 29      Delete "(CP-1)" (second occurrence).

Col. 6, line 38      After "5.1 wt.%" delete "CP-1" and insert --rehydratable alumina (CP-1)--.

Col. 6, line 41      After "4.9 wt.%" delete "CP-1" and insert --rehydratable alumina (CP-1)--.

Claim 34, Col. 8, line 37      Change "32" to --33--.

Claim 36 Col. 8, line 41      Change "33" to --32--.

Signed and Sealed this

Twenty-eighth Day of April, 1992

Attest:

HARRY F. MANBECK, JR.

*Attesting Officer*                    *Commissioner of Patents and Trademarks*